(12) United States Patent
Carneiro

(10) Patent No.: US 10,254,489 B2
(45) Date of Patent: Apr. 9, 2019

(54) CONNECTOR FOR OPTIC FIBER CABLE AND CRIMPING TOOL FOR OPTIC FIBER CABLE

(71) Applicant: FURUKAWA ELECTRIC LATAM S.A., Curitiba (BR)

(72) Inventor: Matheus Kulcheski Carneiro, Curitiba (BR)

(73) Assignee: FURUKAWA ELECTRIC LATAM S.A., Paraná (BR)

( * ) Notice: Subject to any disclaimer, the term of this patent is extended or adjusted under 35 U.S.C. 154(b) by 0 days.

(21) Appl. No.: 15/895,646

(22) Filed: Feb. 13, 2018

(65) Prior Publication Data

US 2018/0231719 A1   Aug. 16, 2018

(30) Foreign Application Priority Data

Feb. 14, 2017   (BR) .............................. 102017002948

(51) Int. Cl.
*G02B 6/26*   (2006.01)
*G02B 6/38*   (2006.01)

(52) U.S. Cl.
CPC ......... *G02B 6/3887* (2013.01); *G02B 6/3802* (2013.01); *G02B 6/3857* (2013.01); *G02B 6/3874* (2013.01); *G02B 6/3891* (2013.01)

(58) Field of Classification Search
CPC ... G02B 6/3887; G02B 6/3802; G02B 6/3857
See application file for complete search history.

(56) References Cited

U.S. PATENT DOCUMENTS

| 8,295,669 B2 * | 10/2012 | Park | G02B 6/3806 385/135 |
| 8,746,987 B2 * | 6/2014 | Choi | G02B 6/3887 385/78 |
| 2012/0128312 A1 * | 5/2012 | Toda | G02B 6/3806 385/136 |

FOREIGN PATENT DOCUMENTS

| BR | 102014016480-4 | 2/2014 |
| WO | WO-2013/129485 | 6/2013 |

* cited by examiner

*Primary Examiner* — Ellen E Kim
(74) *Attorney, Agent, or Firm* — B. Aaron Schulman, Esq.; Stites & Harbison, PLLC

(57) ABSTRACT

The connector (C) comprises: an anchoring element (30) encircling a bolt (20); a semi-tubular clamp (40) having an anterior end portion (41), fitted and retained in the anchoring member (30), and a rear end portion (42) internally provided with inner teeth (43), which, by interference, an extension of the cable cover (CC) of an optical cable (1, 2) is inserted and held; a tubular housing (50) surrounding the anchoring element (30) and the clamp (40). The clamp (40) comprises, in a median region (44), defined between its front end portion (41) and rear end portion (42), at least one pair of side and mutually opposing inner claws (45, 46) between which a fiber jacket (CF) extension of the optical cable (1, 2) is radially engaged and axially retained by interference.

22 Claims, 8 Drawing Sheets

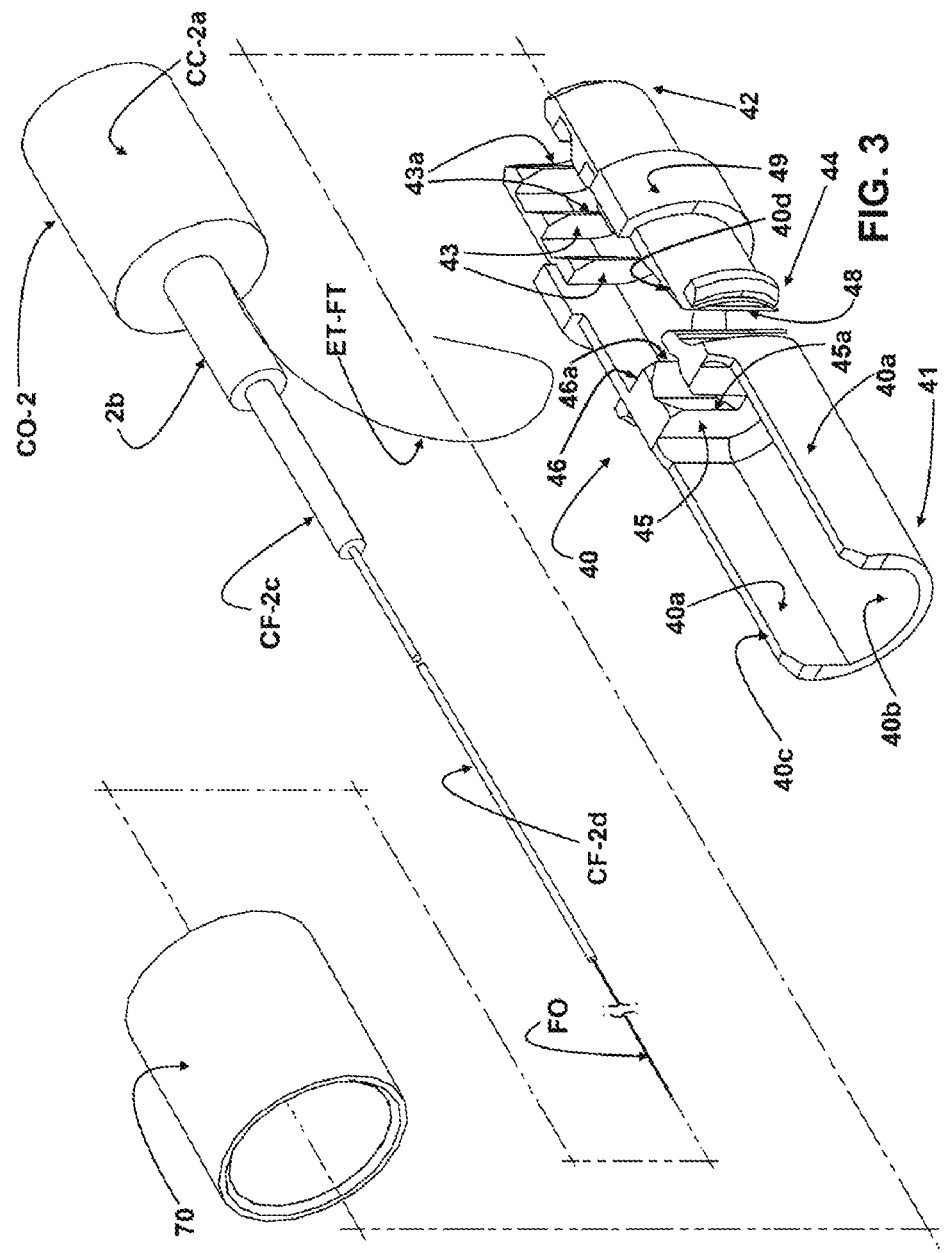

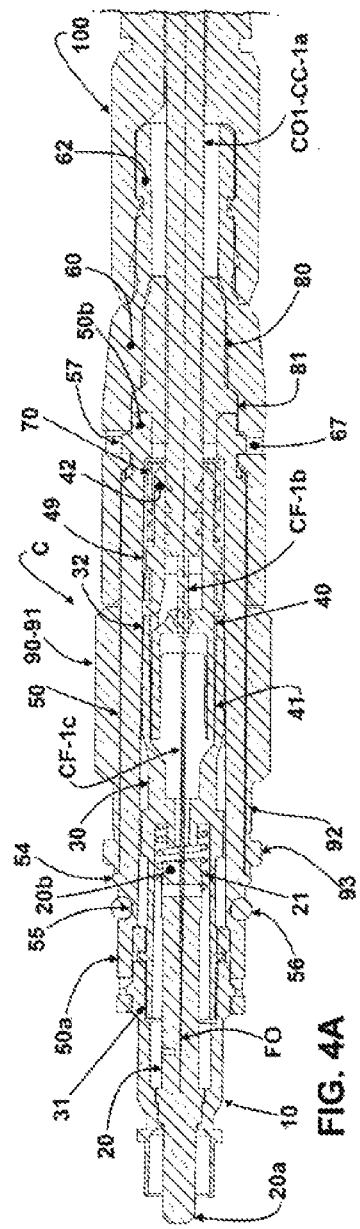
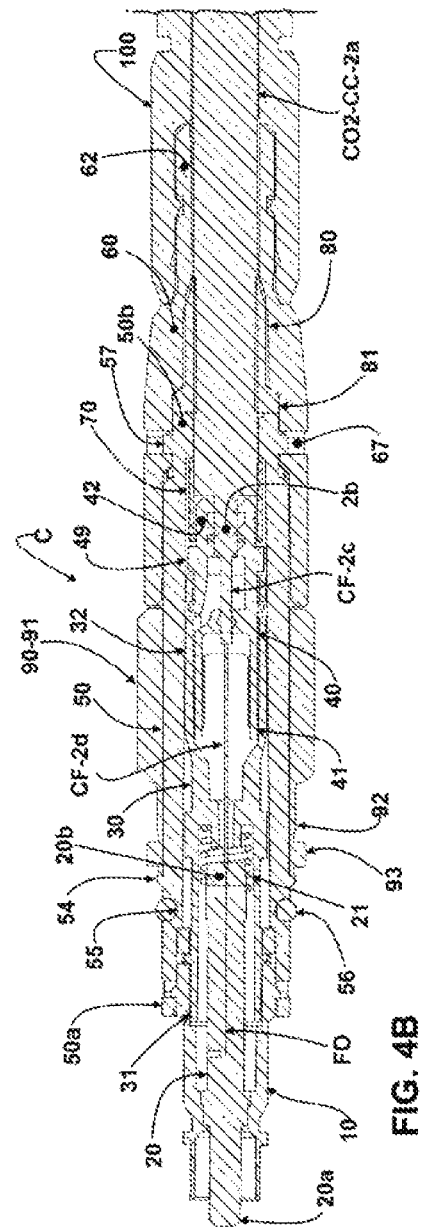

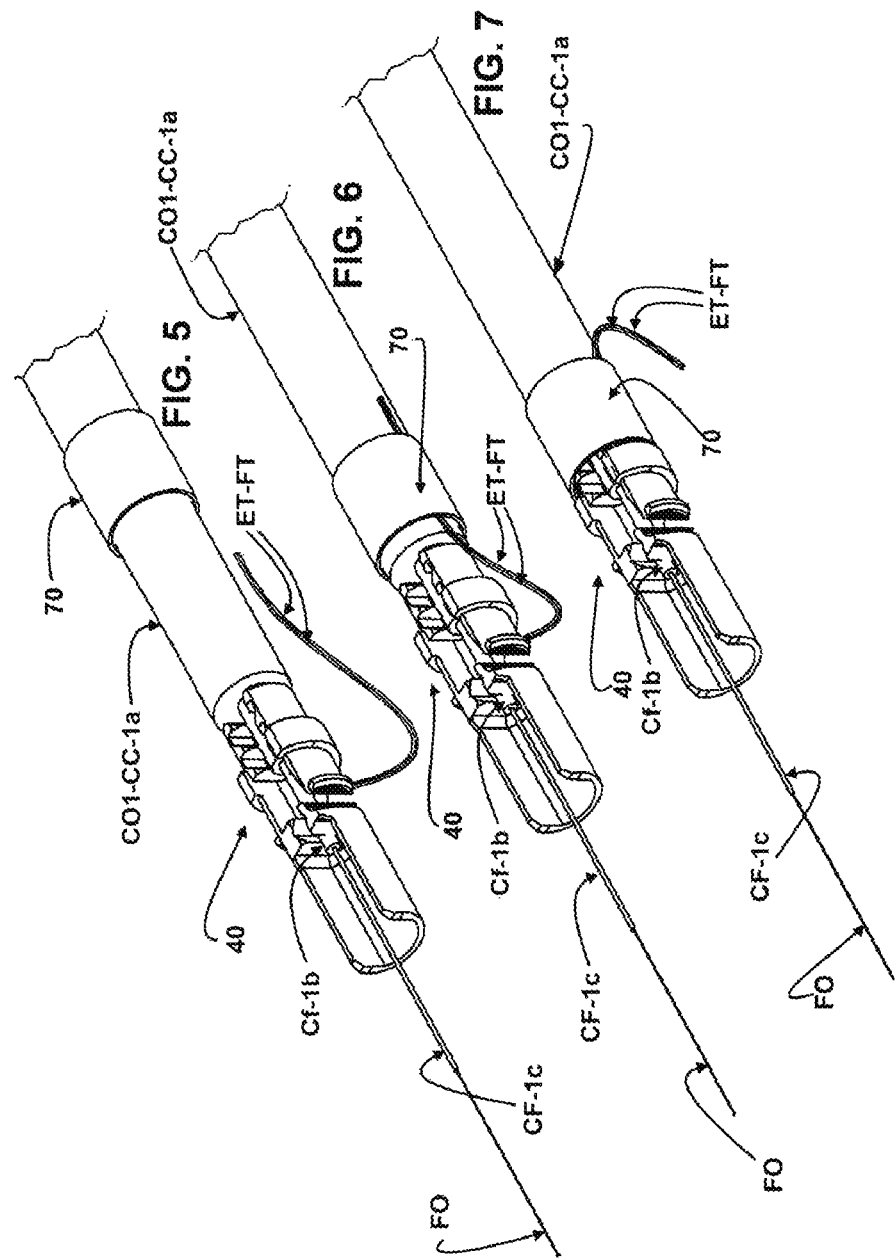

CONNECTOR FOR OPTIC FIBER CABLE AND CRIMPING TOOL FOR OPTIC FIBER CABLE

FIELD OF THE INVENTION

This invention relates to a connector for optical fiber cable and having a basic construction suitable for different cables of circular cross-section, and sufficiently robust and watertight for easy and simple application in different installation conditions, generally in the field, in which the use of assembly tools is generally difficult and even impractical.

The invention further relates to a clamp for circular-section optical fiber cable for promoting retention of said optic fiber cable to a connector.

BACKGROUND OF THE INVENTION

A type of connector used to connect a single optical fiber cable (optical cable), with a plug-socket attached to a door of an external multi-port terminal box, installed overhead or underground and in which plug-sockets are connected the optic fibers of a network to be accessed by different users by means of said single optic fiber cables.

In the type of external application in question, the terminal box plug-sockets and the individual cable connectors shall be constructed to withstand stringent conditions of temperature, humidity, exposure to chemical agents and other adverse operating conditions, generally present in an outdoor installation exposed to the weather.

The connectors are customarily and previously attached to the end of a respective optical access cable, generally using specific tools, to enable the respective optic fiber to be connected to one of the optic fibers of the network by means of the simple plug into a terminal box plug-socket.

A known type of connector is described in the patent application BR 10 2014 016480 4, of the same applicant, being formed by a tubular inner body having a rear end securing one end of an optical cable, and one end prior to which a connecting bolt is attached to a plug-socket of a terminal box; a tubular housing surrounding and retaining the inner body; an anchoring means defined by a crimping tube, for anchoring the jacket and the pulling elements of the optical cable to the inner body.

In this type of connector, the crimping tube involves an extension of the traction elements placed over a portion of the inner body to be crimped in at least two regions axially spaced apart from each other and, together with the confronting portion of the elements, inwardly from an external circumferential recess of the inner body to penetrate the outer jacket of the optical cable anchoring both the jacket and pulling elements to the connector's inner body.

The connector described above requires the provision of the crimping tube and consequently, specific tools for carrying out said crimping operation, making it difficult or even impossible to mount such connector at the end of an optical cable in the field.

In addition to the above-mentioned limitation relating to the requirement for mounting tools installed at specific locations, this known connector also requires the provision of equipment to ensure the correct introduction of the bare optical fiber projecting from the end of the tube jacket, in the interior of the tubular internal body and also the engagement and retention of the bare optical fiber inside the connector bolt, avoiding possible solutions of continuity of transmission between the optical fiber and the bolt and also risks of damage in the assembly operation of the optic fiber on the connector.

Another known construction and facing a connector for optic fiber cable is described in WO2 013/129485. In this second construction, the connector also comprises a tubular inner body having a front end to which is attached a connecting bolt to a plug-outlet of a terminal box and a rear end into which a clamp configured to receive and lock the end of the jacket of a low friction optical cable to be adapted to the connector. Finishing and outer closure elements are usually provided around the inner body of the connector.

A first aspect related to the aforementioned field connector concerns the fact that it does not predict its adaptation to the end of circular optical cables and provided with multiple traction cables, generally in aramid, and its design is exclusively directed to the low friction cables.

In such field connectors, the inner body is provided with means for directing the bare optic fiber extension projecting from the end of the cable jacket to its subsequent engagement and retention within the connector bolt, this operation is done manually by the operator without requiring special tools.

The inner body further has an inspection window for enabling the operator to track the guided displacement of the bare optical fiber through the interior of the inner body towards the interior of the bolt at the time of engagement and retention of the clamp within the rearward end of the inner body.

However, in this prior construction the fiber jacket, defined by the acrylate coating (protective sheath of the individual optical fiber) is arranged along the interior of the inner body without any locking point with respect to the latter, being the only one between the optical cable and the inner body made by locking the cable jacket in the clamp and by locking the latter inside the rear end of the inner body of the connector. In this construction, the assembly defined by the bare optical fiber and the respective acrylate fiber jacket is only guided inside the inner body, becoming "loose" inside the latter, even after the bare optic fiber has been engaged and locked in the bolt. It should be noted that in this low friction cable, the pair of traction cables is sectioned at the end of the jacket, such traction cables not engaged by the optical cable locking the connector.

In this second connector of the prior art there is no locking of traction cables in relation to the inner body of the connector, it being evident that its design is exclusively intended for assembly in low friction cables subjected to tensile stresses relatively small, allowing the locking optical cable connector to be secured exclusively by locking the cable jacket without any locking of the pull cables to the connector body.

Thus, although the second construction described in WO 2013/129485 allows mounting the connector at the end of a low friction optical cable in the field, without the use of special tools, it has the drawbacks and limitations discussed above.

SUMMARY OF INVENTION

In view of the shortcomings and drawbacks of the connectors of the prior art, the invention has the general aim of providing a connector for optical fiber cables of circular cross-section and subjected to non-negligible tensile stresses to be assembled, in the field without requiring special tools to ensure a solid locking of the cable to the connector and secure mounting of the bare optical fiber to the connector bolt.

More specifically, the invention provides a connector and a clamp to be used in optical cables of circular cross-section and in different diameters, without requiring any constructive modification in the inner body, the bolt and the tubular casing, requiring only the dimensional adaptation of the clamp.

These and other objectives of this invention are achieved from a connector for optical fiber cable of the circular section type and comprising: a cable jacket, a fiber jacket and a optical fiber, the connector of a type comprising: a tubular anchor member having a front end securing a bolt and a rear end; a semi-tubular clamp having an front end portion, engaged and retained at the rear end of the anchoring member, and a rear end portion internally provided with inner teeth, between which an extension of the cable jacket is radially engaged and axially retained;
a tubular housing surrounding the anchor element and the clamp and having a front end housing the bolt, and a rear end in which a cap is locked.

According to the invention, the clamp comprises, in a median region, defined between the front and rear end portions, at least one pair of inner, lateral and mutually confronting claws between which an extension of the fiber jacket is radially engaged and axially retained by interference.

According to one aspect of the invention, the fiber jacket extension retained in at least one pair of inner claws is defined by a tight-buffer extension of fiber insulation from an optical cable provided with plurality of traction elements in the form of aramid traction wires placed longitudinally and externally to the tight-buffer of fiber insulation, wherein the extension of the cable jacket, engaged and retained in the internal teeth of the clamp, is defined between an outer jacket extension and an inner jacket extension of said optical cable.

BRIEF DESCRIPTION OF THE DRAWINGS

The invention will now be described on the basis of the accompanying drawings, given by way of example of possible embodiments of the invention, and in which:

FIG. 3 shows an exploded perspective view of an extension of the circular cable with outer jacket and inner jacket and a respective clamp;

FIG. 4A is a longitudinal cross-sectional view of the connector of FIG. 4, taken along the line IV-IV, illustrating the connector when applied to a circular optical cable having an outer jacket, as shown in FIGS. 2 and 2A;

FIG. 4B is a longitudinal cross-sectional view of the connector of FIG. 4, taken along the line IV-IV, but illustrating the connector when applied to a circular optical cable having an outer jacket and an inner jacket, as shown in FIGS. 3 and 3A; and FIGS. 5, 6 and 7 illustrate three different steps of the movements required by the operator to lock the traction cables on the clamp by using a locking ring applicable to a circular cable whose outer jacket is locked on the internal teeth of the clamp.

DESCRIPTION OF THE INVENTION

Figure 1:
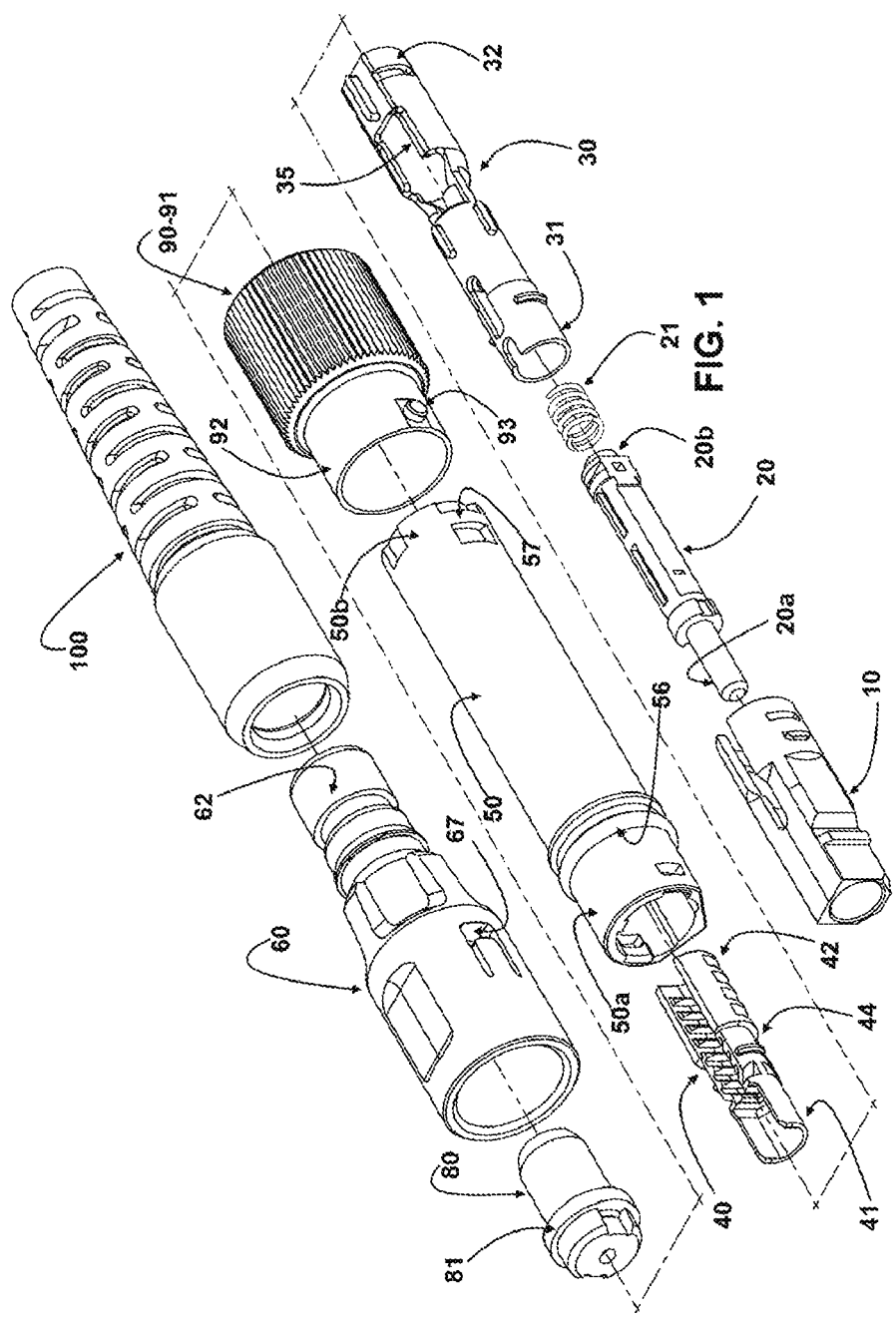
FIG. 1 is an exploded perspective view of the optical connector in question, illustrating a possible clamp construction, to be applied to an optical cable with a circular section.
Figure 2:
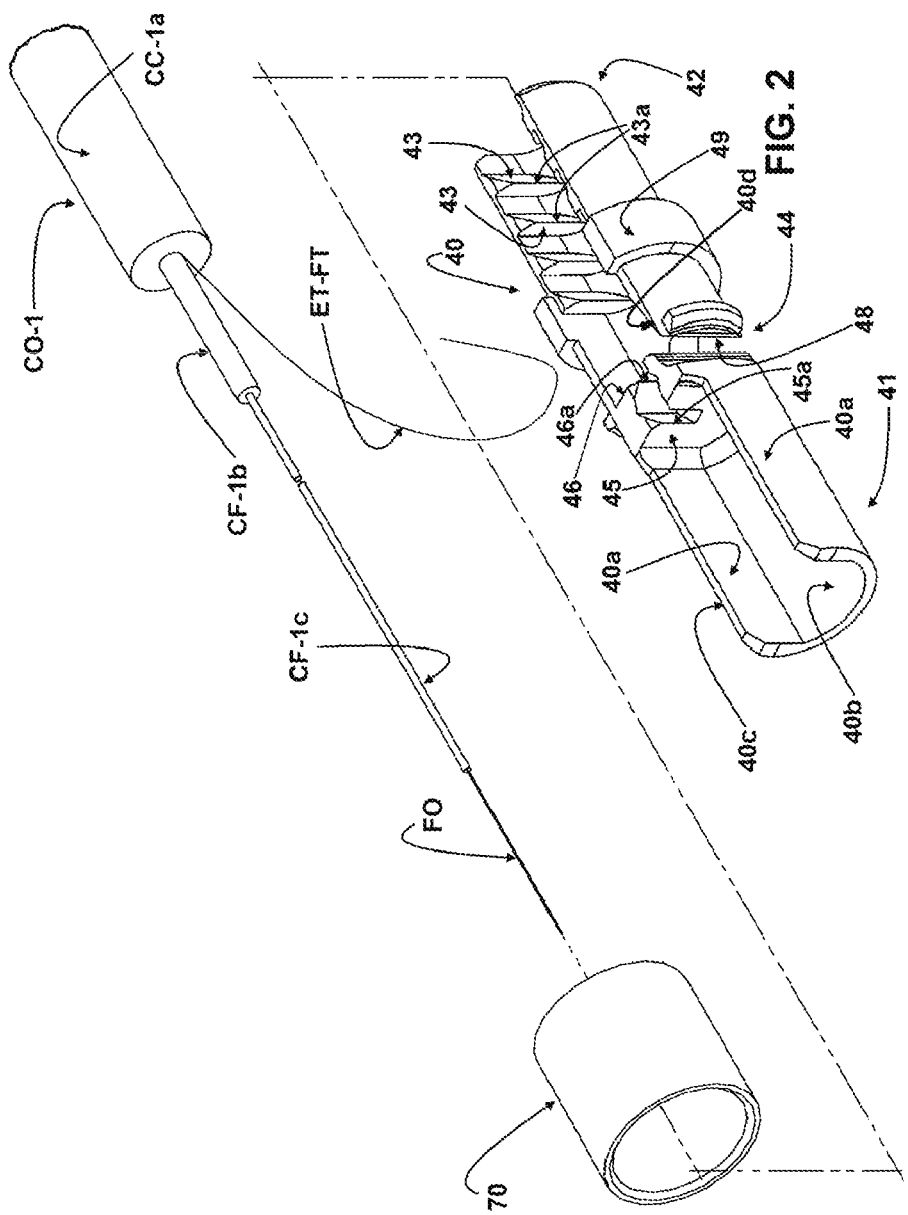
FIG. 2 is an exploded perspective view of a circular cable extension, with an outer jacket, and a respective clamp.
Figure 2A:
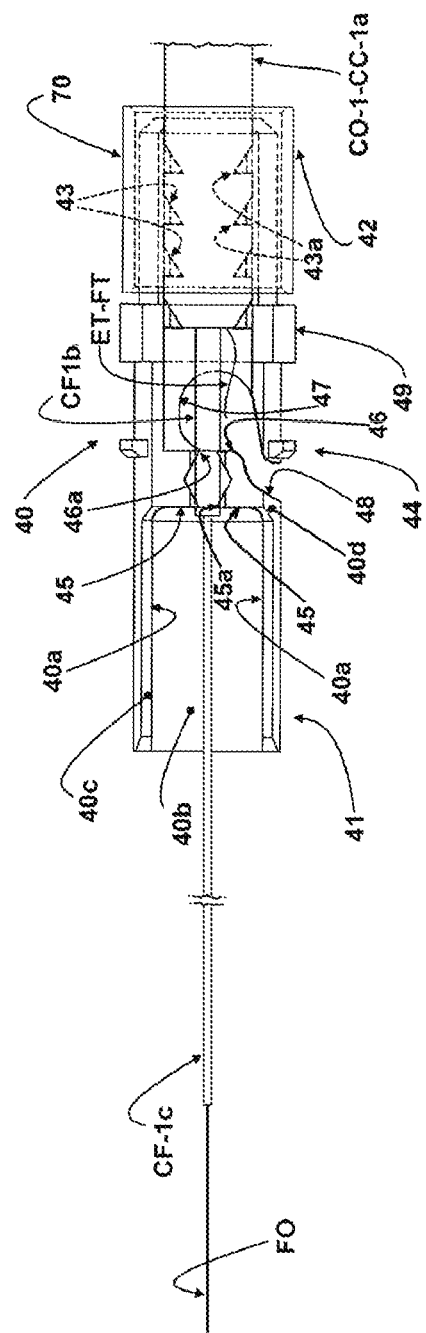
FIG. 2A shows a top view of the elements of FIG. 2, with the terminal extension of the circular cable already engaged and retained in the clamp.
Figure 3A:
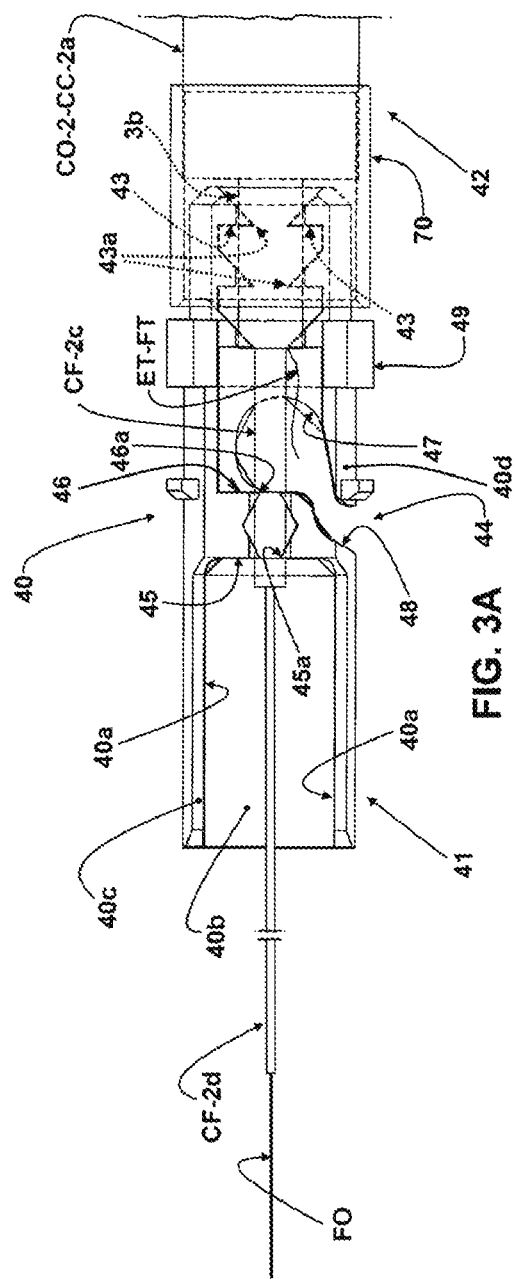
FIG. 3A shows a top view of the elements of FIG. 3, with the terminal extension of the circular cable already engaged and retained in the clamp.

As shown in the accompanying drawings, the connector in question is constructed in two configurations in some of its internal components, for receiving and retaining the terminal portion of different optical cables CO with a circular section and defined as described below.

A first optical cable 1 having a cable jacket CC defined by an outer jacket 1a, with a circular cross-section, generally in a polymeric material, a plurality of traction elements ET in the form of traction wires FT, usually defined by Kevlar fibers normally known as aramid fibers and placed longitudinally and externally to a fiber jacket CF in the form of a tight-buffer of fiber insulation 1b, the traction wires FT being enclosed by the outer jacket 1a. The fiber jacket CF, in the form of a tight-buffer of fiber insulation 1b, envelops another inner fiber jacket CF and defines a tight jacket 1c, generally in acrylate, directly enveloping an optical fiber FO.

A second optical cable 2 having a cable jacket CC defined by an outer jacket 2a, with a circular cross-section, generally in a polymeric material, a plurality of traction elements ET in the form of traction wires FT, usually defined by Kevlar fibers normally known as aramid fibers and place longitudinally around an inner jacket 2b, also with a circular cross-section and in the form of a loose tube of fiber insulation, in polymeric material, a fiber jacket CF in the form of a tight-buffer of fiber insulation 2c, which, in turn, envelops another inner fiber jacket CF and defines a tight jacket 2d, generally in acrylate, directly enveloping a optical fiber FO.
In this second optical cable 2, the traction wires FT are also placed longitudinally and externally to the fiber jacket CF in the form of a tight-buffer of fiber insulation 2c, more specifically externally to the inner jacket 2b (loose tube).

The connector in question basically comprises a tubular plug 10, generally of plastic material, defining an end piece configured in accordance with the TIA-604-3-B standard, to be fitted into a socket-outlet (not shown), generally mounted and retained through a wall of a terminal box, to receive and lock, simply, securely and sealingly, the connector, as is well known in the art.

Inside the plug 10, it is axially mounted a bolt 20 having a front end 20a projecting slightly out of the plug 10 and a rear end 20b seated, by an elastic means 21, generally in the form of a helical spring, in the interior of a tubular anchoring element 30 having an anterior end 31 surrounding the bolt 20 and around which is plugged and locked, by any known construction, the plug 10. The anchoring element 30 has a rear end 32 in which an anterior end portion 41 of a semi-tubular clamp 40 is inserted and axially retained having side walls 40a, a bottom wall 40b and a top opening 40c, which extend along said front end portion 41. The clamp 40 further has a rear end portion 42, internally provided with inner teeth 43 between which it is radially engaged and axially retained, by interference an extension of the cable jacket DC, which may be defined by the outer jacket 1a of the first circular optical cable 1, and which is exemplarily considered to be 3 mm in diameter, or else the inner jacket 2b (loose tube) of the second circular optical cable 2 and which is exemplarily considered to be 5 mm in diameter.

The connector in question further comprises a tubular housing 50, constructed of any suitable material, plastic or metal, surrounding the anchoring element 30 and the clamp 40 and having an anterior end 50a enclosing the bolt 20 and a rear end 50b in which the cap 60 is locked.

Figure 4:
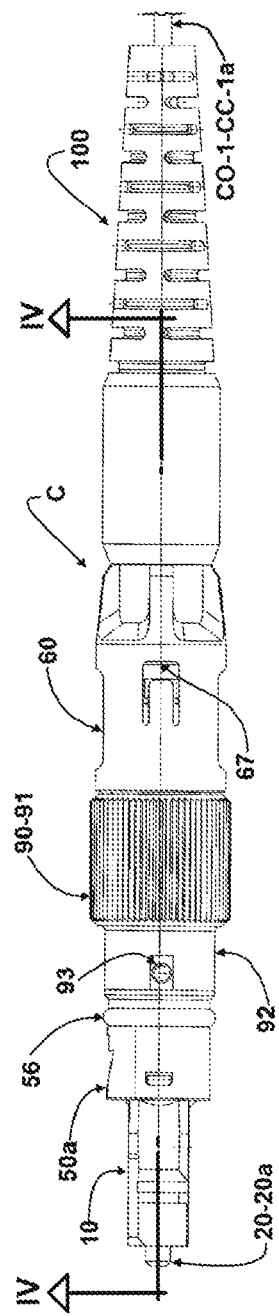
FIG. 4 shows a plan view of the optical connector in the condition mounted at the end of an optical cable with a circular section and rotated 90° compared to that shown in FIG. 1.

As best shown in FIGS. 4A and 4B, the front end 50a of the tubular housing 50 is configured to be indexably mounted and axially locked as well known in the art, around part of the plug 10, within which the bolt 20 is constructed in a known manner to receive and retain an extension of the optical fiber FO in a "bare", projecting condition of the end of the fiber jacket CF of the optical cable 1, 2, to be mounted on the connector.

The connector further comprises a locking ring 70, to be used in conjunction with the first and second optical cable 1, 2, a tubular sealing bush 80, positioned between the rear end portion 42 of the clamp 40 and the cap 60, a coupling device 90 which takes the form of a sleeve 91, with part of its knurled outer surface or otherwise crimped, to facilitate hand gripping. The sleeve 91 is rotatably free mounted around the tubular housing 50 between the cap 60 threaded rear end 20b and an outer circumferential groove 54 incorporated in the tubular housing 50. The sleeve 91 has an anterior portion 92, with reduced outer contour and incorporating two opposing radial pins 93, to act as bayonet-type engagement elements for the coupling device 90.

The elastomer sealing bush 80 ensures the sealing in the posterior region of the connector C, having an internal cross-sectional contour corresponding to the outer cross-sectional contour of the optical cable 1 or 2. The sealing bush 80 incorporates a small outer peripheral flange 81 radially projecting from the outer circular contour and being axially seated and pressed against the front end 50b of the tubular housing 50.

In addition to ensuring a good sealing of the rear region of the connector C, the assembly of the sealing bush 80, radially compressed by the cap 60, provides an additional anchor point of the optical cable 1, 2 in the tubular housing 50, depending on the friction generated by the pressure exerted between the elastomer material of the sealing bush 80 and the outer jacket 1a, 2a of the optical cable 1, 2 and against the inner surface of the cap 60 itself, further avoiding the use of the known sealing elements defined by a heat-shrinkable tube.

The tubular housing 50 further incorporates at least one outer circumferential groove 55 within which is housed an elastomer O-ring 56 to be pressed and elastically deformed against a respective inner wall confronting a socket-outlet of a terminal box (both not shown).

As can be seen from FIGS. 4A and 4B, the tubular housing 50 incorporates, in the region of its rear end 50b, two outer radial projections 57, which are engageable in the respective radial windows 67 of the cap 60, allowing the latter to be axially and rotationally locked onto the front end 50b of the housing 50.

This construction allows the elongated tubular-shaped cap 60, when engaged with the rear end 50b of the tubular housing 50, to enclose the sealing bush 80, radially sealingly pressed against the outer jacket 1a, 2a of the optical fiber cable 1, 2, mounted in the connector and axially against the rear end 50b of the tubular housing 50.

The connector may further be provided with a tubular shield 100, generally elastomeric, coupled over a rear end 62 of the cap 60 and extending axially, by some flexible extension, over a respective portion of the optical cable CO, adjacent to the connector.

According to the invention, clamp 40 comprises, in a median region 44, defined between the front end portion 41 and rear end portion 42, at least one pair of inner, lateral and mutually confronting claws 45 between which an extension of the fiber jacket CF is radially engaged and axially retained by interference, which may be defined by a tight-buffer extension of fiber insulation 1b, 2c of the first or second optical cable 1,2.

According to the illustrated construction, the median region 44 of the clamp 40 has a pair of mutually opposing, lateral, inner claws 45 radially projecting into the median portion 44 of the clamp 40, each terminating in a cutting edge 45a contained in a plane orthogonal to the geometric axis of the clamp 40 and outer and in front the cross-section of the respective inner claw 45.

In another possible construction, the clamp 40 is provided with a pair of additional, radially projecting lateral inner and outer claws 46 for the interior of the median portion 44 of the clamp 40, each to terminate in a cutting edge 46a contained in a plane orthogonal to the geometric axis of the clamp 40 and outer and behind the cross-section of the respective additional inner claw 46.

The inner claws 45, 46 of any of the pairs of inner claws 45 and additional inner claws 46 are placed in the same plane orthogonal to the axis of the claw 40 and the planes of each of said pairs of inner claws 45, 46, axially spaced apart from each other. This arrangement allows said inner claws 45, 46 to act in pairs and preferably in two axially distinct regions of a fiber jacket CF of the optical cable mounted to the connector.

In the preferred and illustrated construction, the internal teeth 43 of the clamp 40 are radially inwardly projecting from the inner surface of the rear end portion 42 of the clamp 40, each terminating at a cutting edge 43a contained in a plane orthogonal to the geometric axis of the clamp 40 and external and anterior to the cross-section of the respective inner tooth 43.

In the configuration shown, with the clamp having the semi-tubular shape, its rear end portion 42 has its inner surface defined by two opposing side portions and a lower portion, each inner tooth 43 continuously extending by said teeth lateral and lower portions of the inner surface of the rear end portion 42 of the clamp 40, maintaining its cutting edge 43a in a plane orthogonal to the longitudinal axis of the clamp 40.

The fiber jacket CF extension put and retained between at least one pair of inner claws 45, 46 is defined by a tight-buffer extension of fiber insulation 1b, 2c of the first or second optical fiber cable 1,2, cables which are provided with a plurality of traction elements ET in the form of traction wires FT placed longitudinally and externally to the tight-buffer of fiber insulation 1b, 2c, the cable jacket CC extension being engaged and retained in the inner teeth 43 of the clamp 40 defined between an outer jacket extension 1a and an inner jacket extension 2b (loose tube) of the first and second optical cable 1,2, respectively.

When using the first optical cable 1, with a circular section and generally 3 mm in diameter, for example the axial locking of the latter in the connector is done not only by the crimping of the cutting edges 43a of the inner teeth 43 in the outer jacket 1a, as well as in crimping the cutting edges 45a and/or 46a of the inner claws 45, 46 in the fiber jacket CF, which takes the form of a tight-buffer extension of fiber insulation 1b, which surrounds a tight jacket 1c, of acrylate fiber coating, into which the optical fiber FO is housed. Thus, in the case of the first optical cable 1, the proposed construction allows a more effective axial locking not only of the outer jacket 1a by the intense crimping suffered from the cutting edges 43a of the inner teeth 43, but also by the effective crimping of the cutting edges 45a, 46a of the inner claws 45, 46, with a confronting extension of the fiber jacket CF defined by the tight-buffer extension of fiber insulation 1b placed between said inner claws 45, 46.

When using the second optical cable 2, with a circular section and generally with 5 mm in diameter, for example, the axial locking of the latter in the connector is not made by its outer cover 2a, which is sectioned in the region of the rear end 42 of the clamp 40, being seated axially against the latter. In this case, the axial locking of the optical cable is effected by crimping the cutting edges 43a of the inner teeth 43 in the inner jacket 2b (loose tube) of smaller diameter, as well as in the crimping of the cutting edges 45a and/or 46a of the inner claws 45, 46 in the fiber jacket CF, which takes the form of a tight-buffer extension of fiber insulation 2c of the second optical cable 2, enclosing a tight jacket 2d within which the optical fiber FO is housed. Thus, in the case of the second optical cable 2, the proposed construction allows a more effective axial locking not only of the outer jacket 2b (loose tube) by the intense crimping suffered from the cutting edges 43a of the inner teeth 43, but also by the effective crimping of the cutting edges 45a, 46a of the inner claws 45, 46, with a confronting extension of the fiber jacket CF defined by the tight-buffer extension of fiber insulation 2c of the second optical cable, placed between said inner claws 45, 46.

In addition to the aforementioned interlocks between the cable jackets CC and fiber jackets CF on the inner teeth 43 and the inner claws 45, 46 of the clamp 40, it should be noted that on the first and second optical cable 1,2 provided of traction elements ET in the form of traction wires FT, generally in aramid, further axial locking is obtained by virtue of a particular construction for the clamp 40 and for the provision of the aforementioned locking ring 70 and better illustrated in FIGS. 2, 2A, 3, 3A, 4A, 4B, 5, 6 and 7.

The locking ring 70, generally in a metal alloy and pre-mounted around said optical cable 1,2, is fitted around the clamp 40, inside the tubular housing 50, the traction wires FT being directed radially towards outside the clamp 40 and extended longitudinally and compressed radially between the lock ring 70 and the clamp 40 in a first longitudinal direction and between the clamp 40 and the tubular housing 50, in a second direction opposite the first one. This arrangement simply and surely promotes an effective axial locking of the traction wires FT in the clamp 40 and consequently in the anchoring element 30 and in the tubular housing 50 of the connector.

In order to facilitate locking of the traction wires FT, the clamp 40, to be applied to the first or second optical cable 1,2, has a window 47 provided in the bottom wall 40b of said clamp 40, in a defined region between the inner claws 45, 46, and the inner teeth 43, said window 47 extending, through a slot 48 provided from the bottom wall 40b and extending through the side wall 40a, to an upper edge 40d of the latter.

In the locking assembly proposed by this invention, the lock ring 70 is engaged in the back portion 42 of the clamp 40, posterior to the window 47 and the slot 48, the back portion 42 of the clamp 40 and the locking ring 70 maintained axially outwardly of the rear end 32 of the anchoring element 30.

This arrangement allows the traction wires FT to be easily locked to the clamp 40 in field operations, without using tools or glue, just after the outer jacket 1a or the inner jacket 2b (loose tube) of the first and second optical cable 1,2, respectively, radially engaged and locked in the inner teeth 43 and having been the tight-buffer extension of fiber insulation 1b, 2c of the first or second optical cable 1,2, engaged and retained, by interference, between the inner claws 45, 46. Thus, the locking of the traction wires FT can be done shortly after the locking of the optical cable on the clamp 40, before the latter is engaged and axially locked in the rear end 32 of the anchoring element 30.

The movements required by the operator to lock the traction wires FT are simplified and briefly illustrated in FIGS. 5, 6 and 7. After the first or the second optical cable 1,2 being engaged in the clamp 40, the traction wires FT are passed out of the bottom wall 40b of the clamp 40 through the slot 48 and the window 47, so as to be then extended in toward the rear end portion 42 of the clamp 40, as shown in FIG. 5. The locking ring 70 is then moved axially around the first or second optical cable 1,2 until it is engaged by the rear end portion 42 of the clamp 40, securing the traction wires FT between the locking ring 70 and the clamp 40, as shown in the sequential FIGS. 6 and 7. The traction wires FT are then bent toward the front end portion 41 of the clamp 40 to be cut to a suitable extent and seated over the locking ring 70, being compressed between the latter and the tubular housing 50, not shown in FIGS. 4A and 4B.

In order to facilitate the correct axial positioning of the locking ring 70, the clamp 40 carries, in its median region 44, an outer stop 49 against one side of which the rear end 32 of the anchoring element 30 rests, and an adjacent end of the locking ring 70 is seated on the opposite side of said outer stop 49.

Once the optical cable 1, 2 has been secured to the clamp 40, the front end portion 41 of the latter can then be engaged and locked at the rear end 32 of the anchoring element 30, with the tight jacket 1c, 2d, and an axial optical fiber FO extension is projecting from said tight jacket, being introduced through the interior of the anchoring element 30, to be engaged and retained within the bolt 20.

In order to facilitate directing the tight jacket 1c, 2d, the anchoring element 30 is provided, near its rear end 32, with an inspection window 35, to be aligned with the top opening 40c of the clamp 40, when its engagement and retention at the rear end 32 of the anchoring element 30, allowing the assembling operator to visualize the direction of the tight jacket 1c, 2d and the bare optical fiber FO through the interior of the anchoring element 30 until it engages the bolt 20, which operation may be facilitated by using disposable guides, not shown, because they are not part of the invention.

The anchoring element 30 is further internally provided, in a median region, prior to the inspection window 35, a guide cone, with the major base facing the inspection window 35 and with the smaller base facing the bolt 20 and having an inner diameter slightly greater than that of the tight jacket 1c, 2d, and aligned with the geometric axis of the bolt 20.

The anchoring system proposed by this invention provides a more intense bite of the inner teeth 43 of the clamp 40 in the outer jacket 1a or the inner jacket 2b (loose tube) of the first and second optical cable 1,2, respectively, and also the bite retention of the at least one pair of inner claws 45, 46, on a confronting tight-buffer extension of fiber insulation 1b, 2c of the first or second optical cable 1,2, which fiber extension encloses the tight jacket 1c, 2d of said optical cables 1,2. This double retention gives greater reliability to the attachment of the first and second optical cable 1,2 to the connector using the cable jacket CC and the fiber cable CF and the axial locking of the traction wires FT by means of the locking ring 70.

Although only three constructive variations have been described for the connector and the clamp, it should be understood that shape changes of the components involved may be made without departing from the inventive concept defined in the claims accompanying this report.

The invention claimed is:

1. A connector for an optical fiber cable having a circular section and comprising a cable jacket, a fiber jacket, an optical fiber and traction elements external to the fiber jacket, wherein the connector further comprises:
   a tubular anchoring element having a front end, for securing a bolt, and a rear end;
   a semi-tubular clamp having side walls, a bottom wall and a top opening extending through a front end portion of the clamp, engaged and retained in the rear end of the anchoring element, and by a rear end portion of the clamp, internally provided with inner sawteeth, between which it is radially engaged and axially retained, by interference, an extension of the cable jacket; and
   a tubular housing surrounding the anchoring element and the clamp and having a front end enclosing a bolt, and a rear end having a cap,
      wherein the clamp comprises, in a median region, defined between the front end portion and rear end portion, at least one pair of side inner claws mutually facing each other, between which an extension of the fiber jacket is radially engaged and axially retained by interference.

2. The connector according to claim 1, wherein the connector has a pair of radially projecting side and mutually opposing inner claws inside the median portion of the clamp, each to terminate in a cutting edge contained in a plane orthogonal to the geometric axis of the clamp and external and anterior to the cross-section of the respective inner claws.

3. The connector according to claim 2, wherein the connector has a pair of additional radially projecting side and mutually opposing inner claws towards the interior of the median portion of the clamp, each to terminate at a cutting edge contained in a plane orthogonal to the geometric axis of the clamp and external and posterior to the cross-section of the respective additional inner claws.

4. The connector according to claim 3, wherein the inner claws of either pairs of inner claws and additional inner claws are disposed in the same plane orthogonal to the geometric axis of the clamp and the planes of each of said pairs of inner claws being axially spaced from each other.

5. The connector according to claim 1, wherein the inner sawteeth of the clamp are radially inwardly projecting from the inner surface of the rear end portion of the clamp, each terminating at a cutting edge contained in a plane orthogonal to the geometric axis of the clamp and external and anterior to the cross-section of the respective inner sawtooth.

6. The connector according to claim 5, wherein the rear end portion of the clamp has its inner surface defined by two opposing side portions and a lower portion, each inner sawtooth continuously extending through said lateral and lower portions of the inner surface of the rear end portion of the clamp, maintaining the cutting edge in a plane orthogonal to the longitudinal axis of the clamp.

7. A connector for an optical fiber cable with a circular section and comprising a cable jacket, a fiber jacket, an optical fiber and traction elements external to the fiber jacket, the connector comprising:
   tubular anchoring element having a front end, securing a bolt and a rear end;
   semi-tubular clamp having side walls, a bottom wall and a top opening extending through a front end portion of the clamp, engaged and retained in the rear end of the anchoring element, and by a rear end portion of the clamp, internally provided with inner teeth, between which it is radially engaged and axially retained, by interference, an extension of the cable jacket;
   tubular housing surrounding the anchoring element and the clamp and having a front end enclosing the bolt, and a rear end in which a cap, said connector being characterized in that the clamp comprises, in a median region, defined between the front end portion and rear end portion, at least one pair of side inner claws, and mutually facing each other, between which an extension of the fiber jacket is radially engaged and axially retained by interference
wherein the connector has a pair of radially projecting side and mutually opposing inner claws inside the median portion of the clamp, each to terminate in a cutting edge contained in a plane orthogonal to the geometric axis of the clamp and external and anterior to the cross-section of the respective inner claws;
wherein the connector also has a pair of additional radially projecting side and mutually opposing inner claws towards the interior of the median portion of the clamp, each to terminate at a cutting edge contained in a plane orthogonal to the geometric axis of the clamp and external and posterior to the cross-section of the respective additional inner claws; and
wherein the fiber jacket extension, engaged and retained between at least one pair of inner claws, is defined by a tight-buffer extension of fiber insulation of a first or second optical cable provided with a plurality of traction elements in the form of traction wires placed longitudinally and externally to the tight-buffer of fiber insulation, and the cable jacket extension is engaged and retained in the inner teeth of the clamp defined between an outer jacket extension of the first optical cable and an inner jacket extension, of the second optical cable.

8. The connector according to claim 7, wherein the inner jacket extension of the second optical cable is in the form of a loose tube of fiber insulation.

9. The connector according to claim 7, wherein the connector further comprises a locking ring to be engaged in the clamp within the tubular housing, the traction wires being directed radially out of the clamp and extended longitudinally and compressed radially between the locking ring and the clamp in a first longitudinal direction and between the clamp and the tubular housing in a second direction opposite the first one.

10. The connector according to claim 9, wherein the traction wires are radially directed out of the clamp through a window in the bottom wall of the latter, in a region defined between the inner claws and the inner teeth, said window extending through a slot to an upper edge of one of the side walls of the clamp.

11. The connector according to claim 10, wherein the locking ring is engaged in the rear portion of the clamp, posterior to the window and to the slot, the rear portion of the clamp and locking ring, held axially outwardly of the rear end of the anchoring element.

12. The connector according to claim 11, wherein the clamp carries in its median region an outer stop against a side of which the rear end of the anchoring element rests, whereas on the opposite side of said outer stop is an adjacent end of the locking ring.

13. The connector according to claim 12, wherein the anchoring element is provided with an inspection window to be aligned with the top opening of the clamp in the front end portion of the latter when, engaging and retaining at the rear end of the anchoring element.

14. The connector according to claim 13, wherein the cap is tubular, elongated, engaged and locked over the rear end of the tubular housing, said cap surrounding a sealing sleeve, thereby compressing it, sealingly radially against the outer jacket of the optical cable and axially against the rear end of the tubular housing.

15. The connector according to claim 14, wherein the tubular housing incorporates two external radial projections while the cap is provided with a pair of radial windows in each of which a respective radial outer projection of the tubular housing is engaged and locked.

16. A clamp for an optical fiber cable for fastening to a connector comprising an anchoring element, an optical cable with a circular cross-section having at least one cable jacket and at least one fiber jacket enclosing an optical fiber and traction elements, said clamp being semi-tubular and comprising a front end portion engaged and retained in a rear end of the anchoring element and a front end portion internally provided with inner sawteeth and against each other, between which a cable jacket, said clamp comprising, in a median region defined between the front end portion and a rear end portion, at least one pair of side inner claws, mutually against each other, in which is radially and axially retained, by interference, an extension of the fiber jacket.

17. The clamp according to claim 16, wherein it has a pair of radially projecting side and mutually opposing inner claws inside the median portion of the clamp, each to terminate in a cutting edge contained in a plane orthogonal to the geometric axis of the clamp and external and anterior to the cross-section of the respective inner claw.

18. The clamp according to claim 17, wherein it has a pair of additional radially projecting side and mutually opposing inner claws towards the median portion of the clamp, each to terminate at a cutting edge contained in a plane orthogonal to the geometric axis of the clamp and external and posterior to the cross-section of the respective additional inner claw.

19. The clamp according to claim 18, the inner claws of either pairs of inner claws and additional inner claws are placed in a same plane orthogonal to the geometric axis of the clamp and the planes of each of said pairs of inner claws axially spaced from each other.

20. The clamp according to claim 19, wherein the inner sawteeth of the clamp are radially inwardly projecting from the inner surface of the rear end portion of the clamp, each terminating at a cutting edge contained in a plane orthogonal to the geometric axis of the clamp and external and anterior to the cross-section of the respective inner sawtooth.

21. The clamp according to claim 20, wherein the rear end portion of the clamp has its inner surface defined by two opposing side portions and a lower portion, each inner sawtooth continuously extending through said lateral and lower portions of the inner surface of the rear end portion of the clamp, maintaining its cutting edge in a plane orthogonal to the longitudinal axis of the clamp.

22. A clamp for an optical fiber cable for fastening to a connector provided with an anchoring element, an optical cable with a circular cross-section having at least one cable jacket and at least one fiber jacket enclosing an optical fiber and traction elements, said clamp being semi-tubular and having a front end portion engaged and retained in a rear end of the anchoring element and a front end portion internally provided with inner teeth and against each other, between which a cable jacket, said clamp comprises, in a median region defined between the front end portion and a rear end portion, at least one pair of side inner claws, mutually against each other, among which is radially and axially retained, by interference, an extension of the fiber jacket;

wherein said clamp has a pair of radially projecting side and mutually opposing inner claws inside the median portion of the clamp, each to terminate in a cutting edge contained in a plane orthogonal to the geometric axis of the clamp and external and anterior to the cross-section of the respective inner claw;

wherein said clamp has a pair of additional radially projecting side and mutually opposing inner claws towards the median portion of the clamp, each to terminate at a cutting edge contained in a plane orthogonal to the geometric axis of the clamp and external and posterior to the cross-section of the respective additional inner claw;

wherein the inner claws of either pairs of inner claws and additional inner claws are placed in a same plane orthogonal to the geometric axis of the clamp and the planes of each of said pairs of inner claws axially spaced from each other;

wherein the inner teeth of the clamp are radially inwardly projecting from the inner surface of the rear end portion of the clamp, each terminating at a cutting edge contained in a plane orthogonal to the geometric axis of the clamp and external and anterior to the cross-section of the respective inner tooth;

wherein the rear end portion of the clamp has its inner surface defined by two opposing side portions and a lower portion, each inner tooth continuously extending through said lateral and lower portions of the inner surface of the rear end portion of the clamp, maintaining its cutting edge in a plane orthogonal to the longitudinal axis of the clamp; and wherein the fiber jacket extension, engaged and retained between at least one pair of inner claws, is defined by a tight-buffer extension of fiber insulation of a first or second optical cable provided with plurality of traction elements in the form of traction wires placed longitudinally and externally to the tight-buffer of fiber insulation, and the cable jacket extension is engaged and retained in the inner teeth of the clamp defined between an outer jacket extension of the first optical cable and an inner jacket extension, of the second optical cable.

\* \* \* \* \*